Nov. 1, 1932.  F. H. JONES  1,886,193

CLUTCH

Filed Oct. 10, 1929   2 Sheets-Sheet 1

Inventor
Frank H. Jones,

By *[signature]*

Attorney

Nov. 1, 1932.  F. H. JONES  1,886,193
CLUTCH
Filed Oct. 10, 1929   2 Sheets-Sheet 2
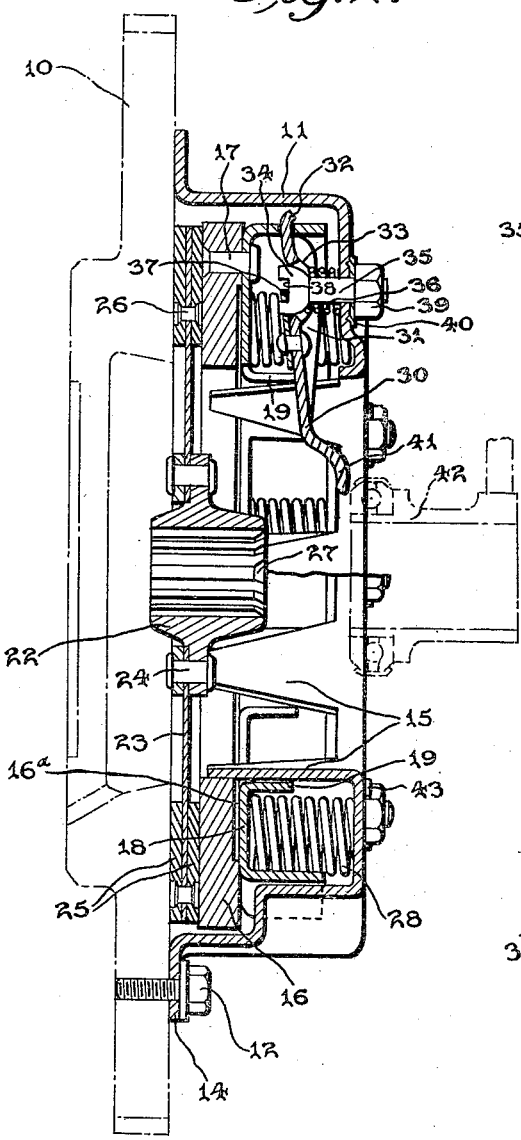
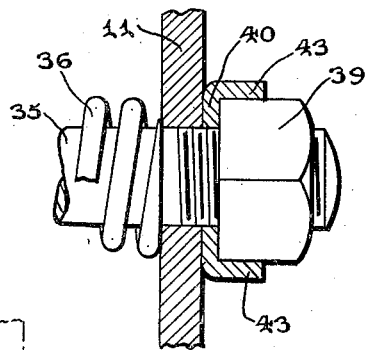
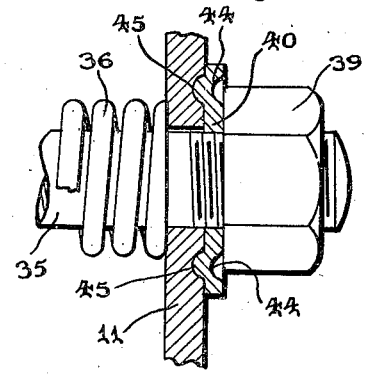
Inventor
Frank H. Jones,
Attorney Patented Nov. 1, 1932

1,886,193

UNITED STATES PATENT OFFICE

FRANK H. JONES, OF UPPER SANDUSKY, OHIO

CLUTCH

Application filed October 10, 1929. Serial No. 398,759.

The object of the invention is to provide a clutch in which substantially all of the essential parts are formed from stampings pressed to the desired shape; to provide a clutch in which the number of necessary parts is reduced to a minimum so that the clutch is susceptible of cheap manufacture and low marketing cost; to provide a device of this nature particularly adapted for inclusion in the operative connections between a motor vehicle engine and the propeller shaft of the vehicle and which may be readily mounted on the fly wheel of the engine without any modifications thereof; to provide a clutch in which the housing is so formed that when attached to the fly wheel it not only effects a driving connection with the pressure ring but also serves as a centering means for the latter; to provide a clutch in which pressure ring release levers are operatively connected with the ring and adjustably mounted in the housing, so that adjustment for wear on the friction rings may be readily provided for; to provide a simple but effective means for the adjustment of the release levers, so that when once set, their adjustment is positively maintained; and to provide a construction in connection with the release levers that makes for silent running, in that rattling of the levers in any position is prevented.

With this object in view the invention consists in a construction and combination of parts of which a preferred embodiment is illustrated in the accompanying drawings, wherein:

Figure 2 is a sectional view on the plane indicated by the line 2—2 of Figure 1.

Figure 1:
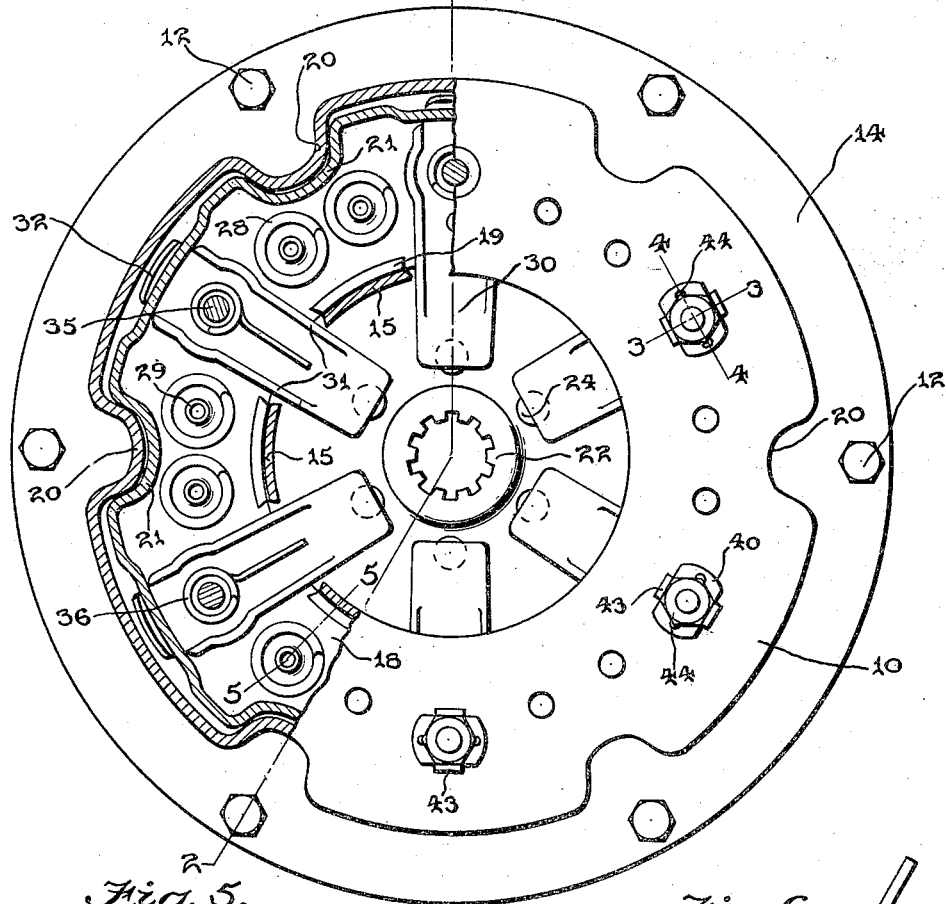
Figure 1 is a rear elevational view of a clutch embodying the invention, the housing being partly broken away.

Figures 3 and 4 are detail views on the planes indicated by the lines 3—3 and 4—4 respectively of Figure 1.

Figure 5:
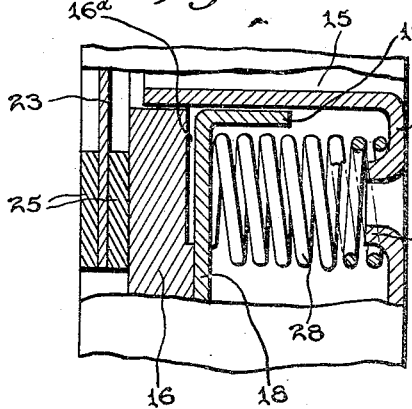

Figure 5 is a sectional view on the plane indicated by the line 5—5 of Figure 1.

Figure 6:
Figure 7:
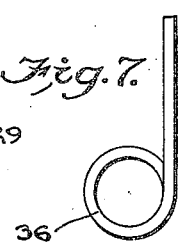

Figures 6 and 7 are respectively elevational and top plan views of the release lever pressure springs.

The invention is designed for direct mounting on the rear face of the fly wheel 10, indicated in dotted lines. The housing 11 which is preferably a pressed steel stamping is secured direct to the fly wheel by means of cap screws 12 which pass through the flange 14 of the housing. At the center, the housing is punched to provide a plurality of longitudinally tapering fingers 15 which are inturned to lie in a cylindrical surface concentric with the housing 11. These fingers, thus, provide the centering means for the pressure ring 16 to the rear face of which is secured, as by rivets 17, the pressure ring stamping 18 which is formed with a series of inner flanges 19 conforming to and engaging the outer surfaces of the fingers.

A positive driving connection is effected between the housing 11 and the pressure ring stamping 18 by reason of peripheral indentations 20 and 21 formed in the two, the indentations in the housing engaging those in the pressure ring stamping, so that there may be relative axial movement between the pressure ring and the housing but no relative angular movement.

The driven element of the clutch consists of a hub 22 to which the friction disk 23 is secured, as by rivets 24 and on opposite sides of this friction disk and adjacent the periphery are secured the friction rings 25, rivets 26 being employed to secure the friction rings to the disk. The hub 22 is formed internally with a series of teeth 27 to interlock with corresponding teeth on a driven shaft, so as to effect a positive driving engagement between the hub and the shaft but at the same time permit relative axial movement of the two, since the hub must move axially to break the frictional driving engagement between the disk and the rest of the clutch structure.

With the friction rings 25 disposed on opposite sides of the disk 23, the one is engaged by the pressure ring 16 and the other by the rear face of the fly wheel 10 when the pressure ring is forced forwardly, as it is by the springs 28 which are arranged in pairs with the pairs arranged in a circle concentric to the hub 22. The springs 28 bear one end upon the pressure ring stamping 18 and the other end against the inner surface of the rear wall of the housing 11 which is punched at the points of mounting of the springs with the material forced inwardly to provide bosses 29 over which the rear ends of the springs 28 engage. Thus the pressure ring 16 is normally forced into engagement with its attendant friction ring and the remaining friction ring forced into engagement with the face of the fly wheel and, the fly wheel 10 and the housing 11 moving in unison and the pressure ring being positively driven by the housing, the frictional engagement between the friction rings and the fly wheel and pressure ring respectively results in imparting turning movement to the hub 22 and the shaft driven thereby.

While the normal position of the parts provides for a driving connection between the driving and driven elements, means is provided for releasing the driven element (consisting of the hub 22, friction disk 23 and friction rings 25) when desired and these means consist of release levers 30 which are preferably steel stampings which are formed with lateral upturned extensions 31 to strengthen them and give them rigidity in the direction of their length. The release levers are arranged radially, their inner ends lying between the fingers 15 of the housing and the flanges 19 of the pressure ring stamping, and they have their outer ends formed with tongues 32 engaging in slots in the peripheral flange of the pressure ring stamping between the indentations 21 of the latter. By means of the tongues 32, pivotal connections are effected between the levers and the pressure ring stamping and to provide for a fixed rocking connection between the levers and the housing 11, the levers are formed with depressions 33 adjacent their outer ends in which are seated the heads 34 of fulcrum studs 35, the shanks of the studs passing through holes formed in the levers at the centers of the depressions. Springs 36 surround the studs 35 and bear one end against the inner face of the rear wall of the housing 11 and the other ends on the levers. These springs thus serve to keep the levers in contact with the head 34. In order that there may be no relative turning movement between the studs and the levers, the latter have secured thereto the keeper plates 37 which engage in slots 38 of the heads 35.

The studs 35 are adjustable axially to vary the positions of the fulcrum points of the levers to compensate for wear upon the friction rings and this adjustment is provided by means of nuts 39 threadingly engaged with the rear ends of the studs and bearing upon lock washers 40 which surround the studs and are disposed against the outer face of the rear wall of the housing 11. The springs 36, by reason of being compressed between the housing and the heads of the studs, always keep the studs forced forwardly so that the nuts 39 are kept in contact with the lock washers 40 and the latter in contact with the housing.

The inner ends of the release levers are offset as indicated at 41 to provide terminal feet for engagement with the forward end of the release thimble 42 which is designed to be actuated in any acceptable manner so as to be moved forwardly and thus rock the levers on their fulcrum studs which will result in imparting a backward movement to the pressure ring stamping and pressure ring, thus releasing the latter from engagement with its attendant friction ring, when the hub 22 may slide backwardly and release the other friction ring from the fly wheel.

The springs 36 at the ends bearing upon the levers are extended to provide substantially radial arms which bear on the rear faces of the levers and on the diametrically opposite sides of the studs 35 from the tongues 32. These arms, while having no tendency to move the levers to releasing position for the pressure plate, keep the tongues 32 against one side of the slots in the pressure ring stamping, so that there is no tendency of the levers to rattle, when the elements of the clutch are in operative engagement and the inner ends of the levers freed from engagement with the release thimble. Were it not for the arm extensions of the springs 36, the levers when disengaged from the thimble, would rock slightly by reason of the tongue and slot connection with the pressure plate stamping and this would result in the noise which is effectively prevented by reason of the fingers.

Since the studs 35 are precluded from angular or turning movement with respect to the levers by reason of the keeper plates on the latter and are also prevented from turning with respect to the housing because of the lock washer connection, the setting of the studs to properly position the level fulcrums is always maintained. The construction provides for adjustment to change the fulcrums when desired, however, since axial movement may be imparted to the studs by merely turning the nuts 39. The lock washers 40 are provided with ears 43 on diametrically opposite sides which are turned up into side engagement with the nuts 39. These washers are depressed on the upper face to provide projections 44 on the under face and these projections seat in depressions 45 on the outer face of the housing 11, the depressions 45 for each lock washer being arranged in a circular series concentric with the attendant stud. Thus when the nut is turned, the washer is turned with it, the projections 44 being disengaged from one set of depressions and engaged with another. The spring 36 on each stud always functions to hold the stud in such position as is necessary to maintain the engagement of the lock washer. Thus the stud may be axially adjusted to secure the desired position of the fulcrum and the adjustment once secured is always maintained.

Pressure ring 16 is made preferably of cast iron and being of such material is likely to fracture when subjected to transverse strains such as are imposed in a device of the character of the invention. The use of the pressure ring stamping 18, however, with its peripheral bounding flange, the release levers being connected with this stamping and the main pressure springs bearing upon the same, the pressure ring, to which the stamping is secured, is thus relieved from all such transverse strains, so that it is not likely to fracture as a result of continued use.

The pressure ring 16, it will be noted, is cut away on its rear face from the inner periphery to aline adjacent the outer periphery, so that an air space 16ª is left between it and the pressure stamping. This air space serves as a heat insulating means to prevent the direct transfer of the heat generated by the pressure ring being transmitted to that part of the pressure ring stamping on which the extremities of the pressure springs bear, so that these are not subjected to the deleterious effects of the heat that would be transmitted to them were the pressure ring in contact with the stamping throughout the facing surfaces of the two.

The invention having been described, what is claimed as new and useful is:

1. A clutch for mounting on the fly wheel of an internal combustion engine and comprising a driven member embodying a friction disk and associated friction members, a pressure ring, and a housing adapted to be bolted onto the fly wheel and formed at its center with internally directed fingers constituting centering means for the pressure ring, the latter being yieldingly impelled towards the friction disk and being provided with means for withdrawing it from the friction disk.

2. A clutch for mounting on the fly wheel of an internal combustion engine and comprising a driven member frictionally engageable with the fly wheel, a pressure ring disposed on the opposite side of the driven member from the fly wheel, a pressed steel housing adapted for bolting to the fly wheel to inclose the pressure ring and driven member, the housing at its center being formed with inturned fingers which constitute centering means for the pressure ring and with which the latter is slidably engageable, springs forcing the pressure ring toward the driven member, and release levers operatively connected with the pressure ring, the pressure ring being provided with a stamping having an interlocking connection with the housing.

3. A clutch for mounting on the fly wheel of an internal combustion engine and comprising a driven member frictionally engageable with the fly wheel, a pressure ring disposed on the opposite side of the driven member from the fly wheel, a pressed steel housing adapted for bolting to the fly wheel to inclose the pressure ring and driven member, the housing at its center being formed with inturned fingers which constitute centering means for the pressure ring and with which the latter is slidably engageable, springs forcing the pressure ring toward the driven member, and release levers operatively connected with the pressure ring, the pressure ring being provided with a stamping having angularly turned flanges slidably engaging said fingers, and said stamping and the housing being formed with interlocking peripheral indentations and projections.

In testimony whereof he affixes his signature.

FRANK H. JONES.